United States Patent [19]

Stuart

[11] 3,746,800

[45] July 17, 1973

[54] CLOCK RECOVERY SYSTEM

[75] Inventor: Richard L. Stuart, Beltsville, Md.

[73] Assignee: Rixon Inc., Silver Spring, Md.

[22] Filed: Aug. 16, 1971

[21] Appl. No.: 172,089

[52] U.S. Cl. .......... 178/69.5 R
[51] Int. Cl. .......... H04l 7/00
[58] Field of Search .......... 178/69.5 R; 179/15 BS

[56] References Cited

UNITED STATES PATENTS

| | | | |
|---|---|---|---|
| 3,479,598 | 11/1969 | Weller | 178/69.5 R |
| 3,585,298 | 6/1971 | Liberman | 178/69.5 R |
| 3,411,090 | 11/1968 | Lescinsky | 178/69.5 R |

*Primary Examiner*—Robert L. Griffin
*Assistant Examiner*—George G. Stellar
*Attorney*—Ross F. Hunt, Jr.

[57] ABSTRACT

A clock recovery circuit for a data communication system, wherein the eye pattern for the data is sampled (by sampling the outputs of the slicer circuits ) and logic circuitry utilized to select only those transitions, i.e., slicer axis crossings, which should be located midway between the desired time sample points and to advance or retard the local clock in accordance with the samples for these transistions. The ratio of advance to retard decisions is utilized to generate, through use of a D to A converter, a control signal for correcting the frequency of the voltage controlled oscillator which serves as the local clock, so that both frequency and phase error correction is provided.

7 Claims, 19 Drawing Figures

| TRANSITION DECISION TABLE | | | | | | | | | |
|---|---|---|---|---|---|---|---|---|---|
| NO. | TRANS | SAMPLE IC | | SAMPLE L | | SAMPLE R | | SAMPLE A | |
| | | $D_1$ | $D_2$ | $D_1$ | $D_2$ | $D_1$ | $D_2$ | $D_1$ | $D_2$ |
| 1 | 1a - 3a | 1 | 1 | 1 | 1 | 1 | 1 | 1 | 1 |
| 2 | 1a - 3b | 1 | 1 | 1 | 1 | 1 | 0 | 1 | 0 |
| 3 | 1a - 3c | 1 | 1 | 1 | 0 | 1 | 0 | 0 | 0 |
| 4 | 1a - 3d | 1 | 1 | 1 | 0 | 0 | 0 | 0 | 1 |
| 5 | 1b - 3a | 1 | 0 | 1 | 0 | 1 | 1 | 1 | 1 |
| 6 | 1b - 3b | 1 | 0 | 1 | 0 | 1 | 0 | 1 | 0 |
| 7 | 1b - 3c | 1 | 0 | 1 | 0 | 0 | 0 | 0 | 0 |
| 8 | 1b - 3d | 1 | 0 | 0 | 0 | 0 | 0 | 0 | 1 |
| 9 | 1c - 3a | 0 | 0 | 1 | 0 | 1 | 0 | 1 | 1 |
| 10 | 1c - 3b | 0 | 0 | 0 | 0 | 1 | 0 | 1 | 0 |
| 11 | 1c - 3c | 0 | 0 | 0 | 0 | 0 | 0 | 0 | 0 |
| 12 | 1c - 3d | 0 | 0 | 0 | 0 | 0 | 1 | 0 | 1 |
| 13 | 1d - 3a | 0 | 1 | 0 | 0 | 1 | 0 | 1 | 1 |
| 14 | 1d - 3b | 0 | 1 | 0 | 0 | 0 | 0 | 1 | 0 |
| 15 | 1d - 3c | 0 | 1 | 0 | 1 | 0 | 0 | 0 | 0 |
| 16 | 1d - 3d | 0 | 1 | 0 | 1 | 0 | 1 | 0 | 1 |

CLOCK RECOVERY SYSTEM

FIELD OF THE INVENTION

The present invention relates to data communication systems and, more particularly, to clock recovery systems for multilevel data modems and other bandlimited data transmission systems.

BACKGROUND OF THE INVENTION

Many data communication systems require precise phase and frequency synchronism between the cyclic sampling pulse train and the data wave. This precision is important because any frequency discrepancy will cause a shift of the sampling time with respect to the data wave and hence result in inaccurate sampling. For example, in pulse code modulation systems, the transmitted pulse train must be reconstructed or regenerated after traveling over the line, the process involving both retiming of the pulses and regeneration of their amplitudes. The receive system must decide both when to sample the signal and whether the signal amplitude is above or below a predetermined threshold level during the sampling interval. Hence, the necessity for a reference timing or sampling pulse train.

The sampling pulse train may be transmitted with the data signal, with the attendant necessity of an additional transmission channel or of making all measurements on a loop basis so that the transmitter clock can be used in sampling, or may be generated locally at the receiver. This latter approach presents problems insofar as producing a sampling train of precisely the same frequency as the transmitter clock is concerned because of transmitter drift and because the data signal may be incluce a frequency component at a particular data bit frequency.

The accurate recovery of the frequency and phase of the clock signal is an even more difficult problem for multilevel data communication systems. In general, conventional phase correction techniques, as used in bilevel modems, rely on simply averaging or integrating all crossings of the recovered "eye" to determined the proper phase for the time sample. As is explained in more detail hereinbelow, when such an approach is applied to multilevel systems an innaccurate time sample results. This inaccuracy is caused by the fact that the spread of threshold or slicing levels is very wide as compared with the opening of the "eye" pattern and the distribution of crossings within the spread is a function of the data stream.

SUMMARY OF THE INVENTION

In accordance with the present invention, a clock recovery or timing regeneration system is provided for use with multilevel modulation data modems wherein the data sample time is optimized relative to the slicer decision level or threshold. The receiver eye pattern is operated on such that the eye transitions are sampled and only those axis crossings which should be located half way between the desired time sample points are selected and used in correcting the clock timing, the transitions which do not cross the corresponding slicer decision levels at a point mid-way between the data sample points being negated by appropriate logic. The selected transitions are used to advance or retard the local clock to a position half way between the sample points. In this way the effective spread of data transitions is reduced and, for example, for a four level eye,- the transitions at the three slicer decision levels are reduced to that of an equivalent two level eye.

According to a presently preferred embodiment of the invention a clock recovery circuit is provided which includes a clock frequency generator, a plurality of slicer circuits to which the received data signal is applied, sampling circuits for sampling the outputs of said slicer circuits and, as discussed above, logic circuitry for determining the data signal transitions which cross the slicer circuit decision levels at points midway between the clock sampling points during a sampling interval and for producing a phase control output signal in accordance with the output of the sampling circuits for those transitions. As is explained in more detail hereinbelow the sampling circuits sample the slicer outputs at the clock sampling points and at points midway between the clock sampling points.

The logic circuitry includes electronic gates for producing, in accordance with the output of the sampling circuits, either advance pulses for advancing the phase of the clock generator or retard pulses for retarding the phase of the clock generator, the output of the logic circuitry being connected to a frequency divider chain located at the output of the clock generator to provide the appropriate phase correction.

To provide clock frequency correction, the logic circuit output is integrated over a predetermined time interval preferably by utilizing a counter to compare the number of advance and retard pulses and to produce a corresponding output. This output is converted into an analog signal which is used to control the output of a variable frequency voltage controlled oscillator which serves as the clock generator.

Other features and advantages of the invention will be set forth in or apparent from the detailed description of a preferred embodiment found hereinbelow.

DESCRIPTION OF A PREFERRED EMBODIMENT

Figures 1A, 1B, 2A, 2B, 2C, 2D, 3A, 3B, 3C, 4A, 4B, 4C:
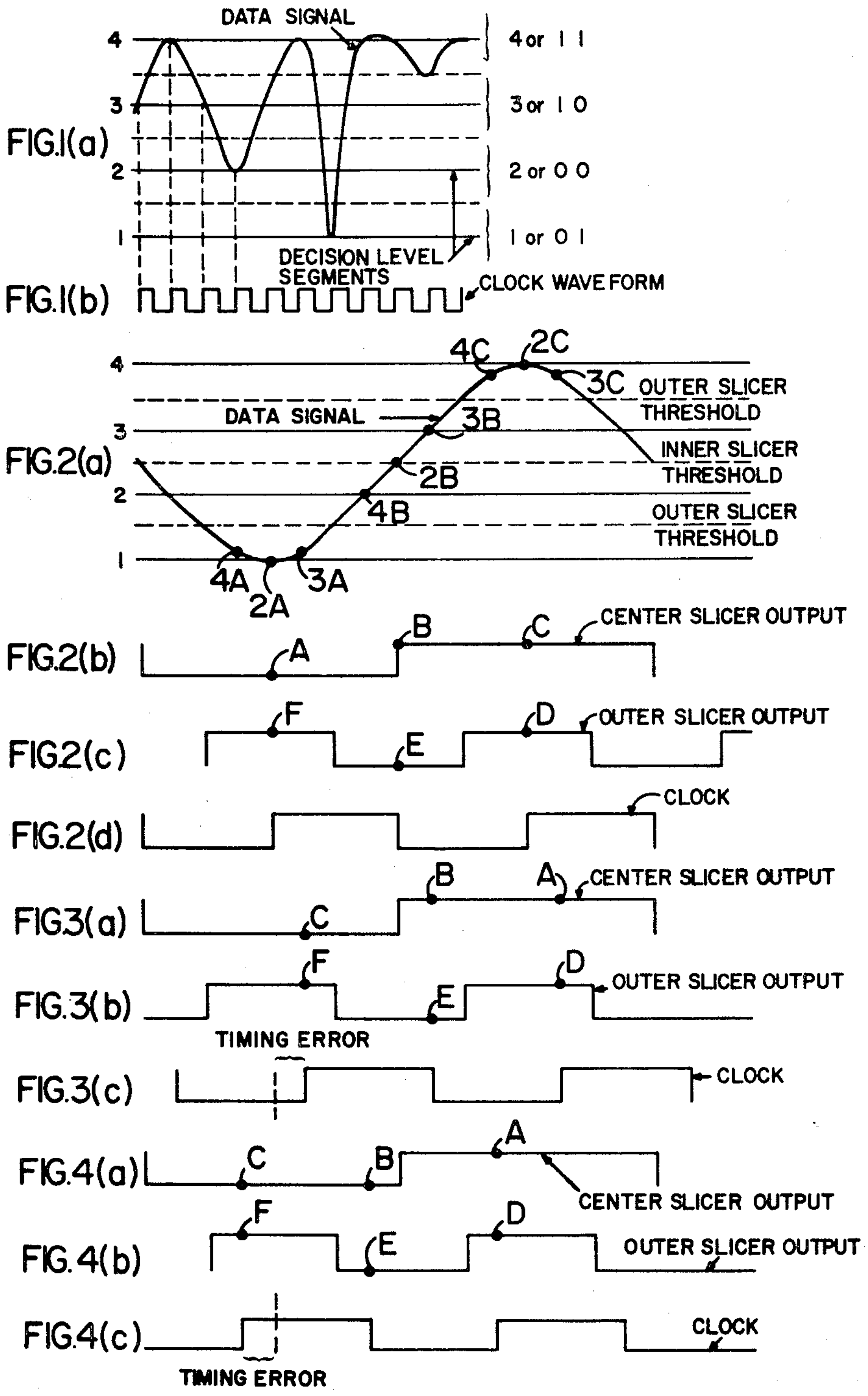
FIG. 1(*a*), included for purposes of explanation, is an amplitude versus time plot of an exemplary four level data signal and FIG. 1(*b*) is the clock waveform for the signal of FIG. 1(*a*)
FIGS. 2(*a*), 2(*b*), 2(*c*) and 2(*d*), also included for purposes of explanation, are amplitude versus time plots of, respectively, a four level data signal, the corresponding center slicer output, the corresponding outer slicer output, and clock waveform for an ideal clock.
FIGS. 3(*a*), 3(*b*) and 3(*c*), also included for purposes of explanation, are amplitude versus time plots of, respectively, the corresponding center slicer output, the corresponding outer slicer output and the clock waveform, for a retarded clock.
FIGS. 4(*a*), 4(*b*) and 4(*c*), also included for purposes of explanation, are amplitude versus time plots of, respectively, the corresponding center slicer output, the corresponding outer slicer output and the clock waveform, for an advanced clock.

As a background to an understanding of the clock recovery system of the invention, the effect of the advanced or retarded clock will first be considered. Referring to FIG. 1(*a*) there is shown a four level signal which has been highly band limited as is usual for data transmitted over long lines. The information contained in the signal is obtained by determining the instantaneous value of the signal, i.e., sampling the signal during the sample times indicated by the leading edge of the clock shown in FIG. 1(*b*). Electronic "slicing" circuits or "slicers" are conventionally used to decide whether the receive level is at level 1, 2, 3 or 4 , or for the coding utilized, 01, 00, 10 or 11, by determining which voltage increment (1, 2, 3 or 4 as shown to the right of FIG. 1(*a*) ) is occupied by the signal at the sample. Two circuits are critical in making the decisions discussed and in controlling clock synchronization, the electronic slicers and the clock control circuit which sets the clock at the optimum point in the receive wave. For a four-level signal, "inner" and "outer" slicer thresholds such as shown in FIG. 2(*a*) may be employed. The inner slicer will produce a digital 0 when the data level is below the middle threshold level, i.e., for levels 1 and 2, and a binary 1 when the data level is above this threshold, i.e., for levels 3 and 4. The outer slicer produces a digital 0 for a data level between the threshold levels, i.e., for levels 2 and 3, and produces a digital 1 for a data level outside these thresholds, i.e., for levels 1 and 4. The outputs of the inner and outer slicers are connected to suitable logic circuits which determine the signal level from these outputs.

Referring to FIG. 2(*a*) a data signal is shown changing from a 1 (or 01) level to a 4 (or 11) level. FIGS. 2(*b*), 2(*c*) and 2(*d*) illustrate the inner slicer output, outer slicer output and clock waveform for an ideal clock, repectively, for the signal of FIG. 2(*a*). Similarly, FIGS. 3(*a*), 3(*b*) and 3(*c*) respectively illustrate the inner slicer output, outer slicer output and clock waveform for a delayed clock and FIGS. 4(*a*), 4(*b*) and 4(*c*) respectively illustrate the inner slicer output, outer slicer output and clock waveform for an advanced clock. Referring particularly to FIGS. 2(*b*) and 2(*d*), three sample times are respectively determined by (1) the leading edge of the first complete clock pulse shown, (2) the trailing edge of the first clock pulse and (3) the leading of the subsequent clock pulse, these times being indicated by points A, B and C in FIG. 2(*b*). The sample times relative to the data wave are indicated in FIG. 2(*a*) and are denoted 2A, 2B and 2C, respectively in that Figure. The corresponding sample times dictated by the retarded clock of FIG. 3(*c*) are denoted 3A, 3B and 3C in FIG. 2(*a*) whereas those dictated by the advanced clock of FIG. 4(*c*) are denoted 4A, 4B and 4C. It will be seen from FIG. 2(*a*) that for the retarded or late clock shown in FIG. 3(*c*) the second and third samples are the same and that for the advanced clock shown in FIG. 4(*c*) the first two samples are the same. The effect on the center slicer for the late clock is shown in FIG. 3(*a*) and for the advanced clock in FIG. 4(*a*). It will, of course, be appreciated that the data level will be incorrectly interpreted because of the erroneous outputs of the center slicers due the retarded and advanced clocks.

Figures 5, 6, 8:
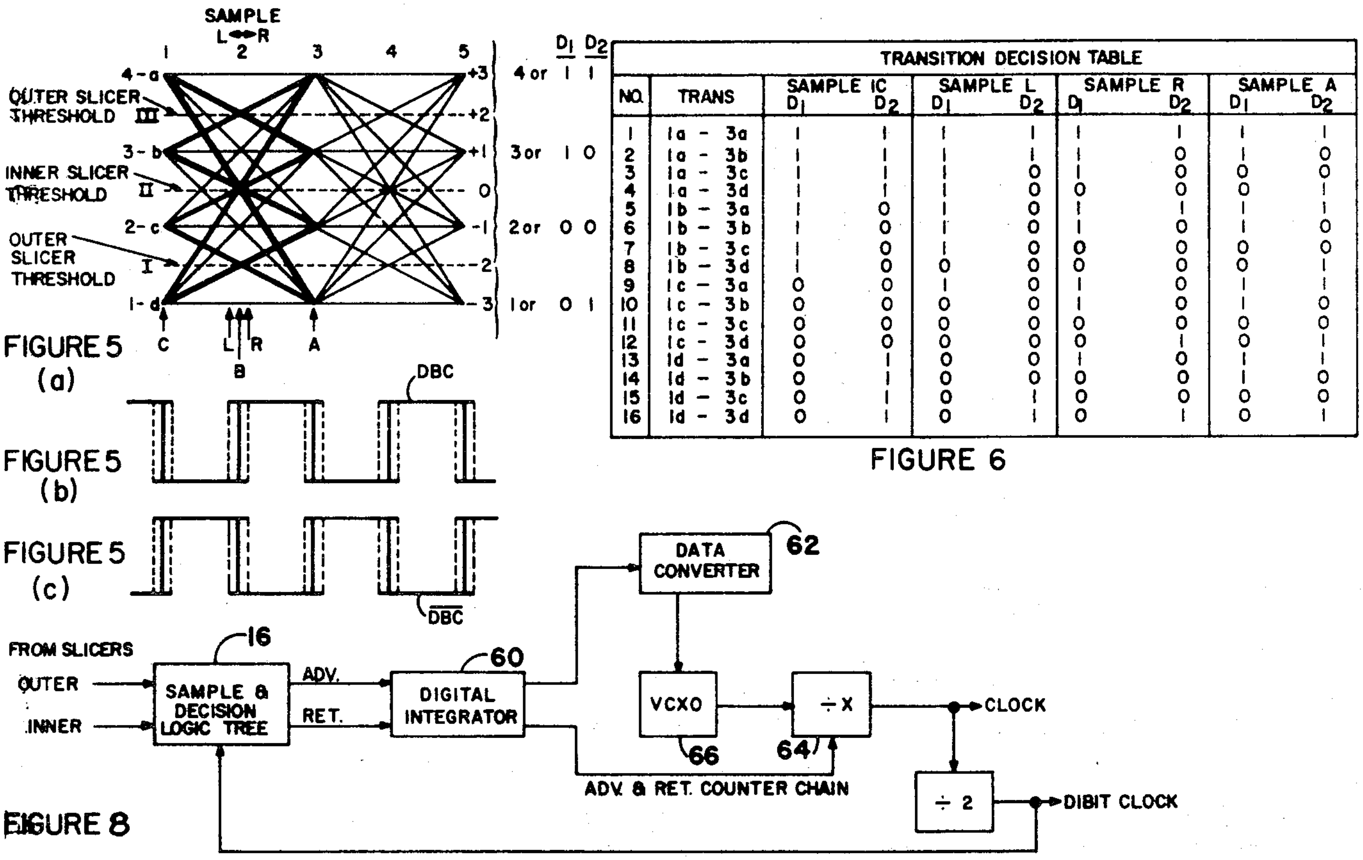
FIG. 5(*a*), also included for purposes of explanation, is an idealized representation of an eye pattern for a four-level random data wave and FIGS. 5(*b*) and 5(*c*) are, respectively, the clock and inverse clock waveforms for the eye pattern of FIG. 5(*a*).
FIG. 6, also included for purposes of explanation, is a transition decision table.
FIG. 8 is a schematic block diagram of a presently preferred embodiment of the overall clock recovery system of the invention.

Referring now to FIG. 5(*a*), an idealized multilevel eye diagram or pattern for a random data wave is shown. Eye patterns are discussed in Bennett and Davey, *Data Transmission*, McGraw-Hill, at page 119 et seq. and in the article by J.S. Mayo entitled "Pulse-code Modulation", appearing in *Electro-Technology*, *November*, 1962, at pages 88 to 98. The eye pattern is a convenient graphical representation of the distribution of pulse shapes within a pulse interval and consists of a superposition of pulses within that interval for all possible pulse sequences. Hence, FIG. 5(*a*) corresponds to FIGS. 1(*a*) and 2(*a*) but with all possible pulse sequences illustrated. As shown, a separate eye, formed by the worst combination of pulse sequences, determines when the signal should be sampled and what the threshold level should be.

In FIG. 5(*a*) the numbers along the top and the letters along the side are used to identify the signal transitions relative to the slicing levels. Although a four level eye is shown, and two outer (upper and lower) slicing levels denoted III and I and a center or middle slicing level denoted II are indicated (corresponding to the levels indicated in FIG. 2(*a*) ), it will be understood that the present invention is applicable to eye patterns of any number of levels.

As was discussed hereinabove, averaging or intergrating the slicing axis crossings will produce an inaccurate time sample. As can be appreciated by inspection of FIG. 1, the inaccuracies discussed above occur because of the very wide spread of axis crossings at the slicing levels for the sample points in question, the eye "openings" being relatively very small and ambigiously located. As should become clear from the discussions hereinbelow, the eye opening will be even smaller and resulting errors more pronounced for an actual, non-idealized eye pattern.

In accordance with the present invention only those axis or slicing level crossings which should be located between the desired sample points (assuming no distortion) are selected for use in time sample phasing. Referring to FIG. 6, a transition decision table is shown. The transitions are identified by the numbers along the top of the eye pattern of FIG. 5(*a*) and the letters along the left side. The samples are identified at the bottom of the eye pattern, the samples L and R representing samples just to the left and just to the right of a sample point B half way between samples C and A. Samples C and A correspond to those dictated by the trailing edge of the first pulse in clock waveform DBC (or the leading edge of inverse clock waveform $\overline{\text{DBC}}$) and the trailing edge of the next pulse in sequence, whereas the intermediate sample B corresponds to that dictated by the leading edge of the said next pulse.

It will be appreciated from inspection of this table that, for example, any determination of the location of the "intermediate" sample B, (that is, the sample point dictated by the leading edge of the first complete pulse shown for clock DBC), which is based on transitions such as transition 3 (1*a* to 3*c*) will be unreliable in that both slicing levels I and II are crossed at a point in the area of the mid-way point between sample points C and B and B and A, respectively, and samples taken slightly to the left and slightly to the right of sample B (indicated, as stated above, by sample L and sample R) yield the same information as to whether the clock is late or early and thus are not of value in determining the proper clock timing. In contrast, transitions such as transition 2 (1a to 3b) which crosses the slicing level I midway between points C and A, provide different information at sample points L and R just to the left and right of point B; in this case, the sample L indicating that the signal is at the 4 or 11 level and the sample R indicating a 3 or 10 level. For the four-level system under consideration only transitions 2, 4, 5, 7, 10, 12, 13 and 15 are utilized in setting the clock, the remaining transitions being disregarded. In this way the proper clock timing can be determined with a substantial improvement in accuracy in comparison with prior art techniques.

Figure 7:
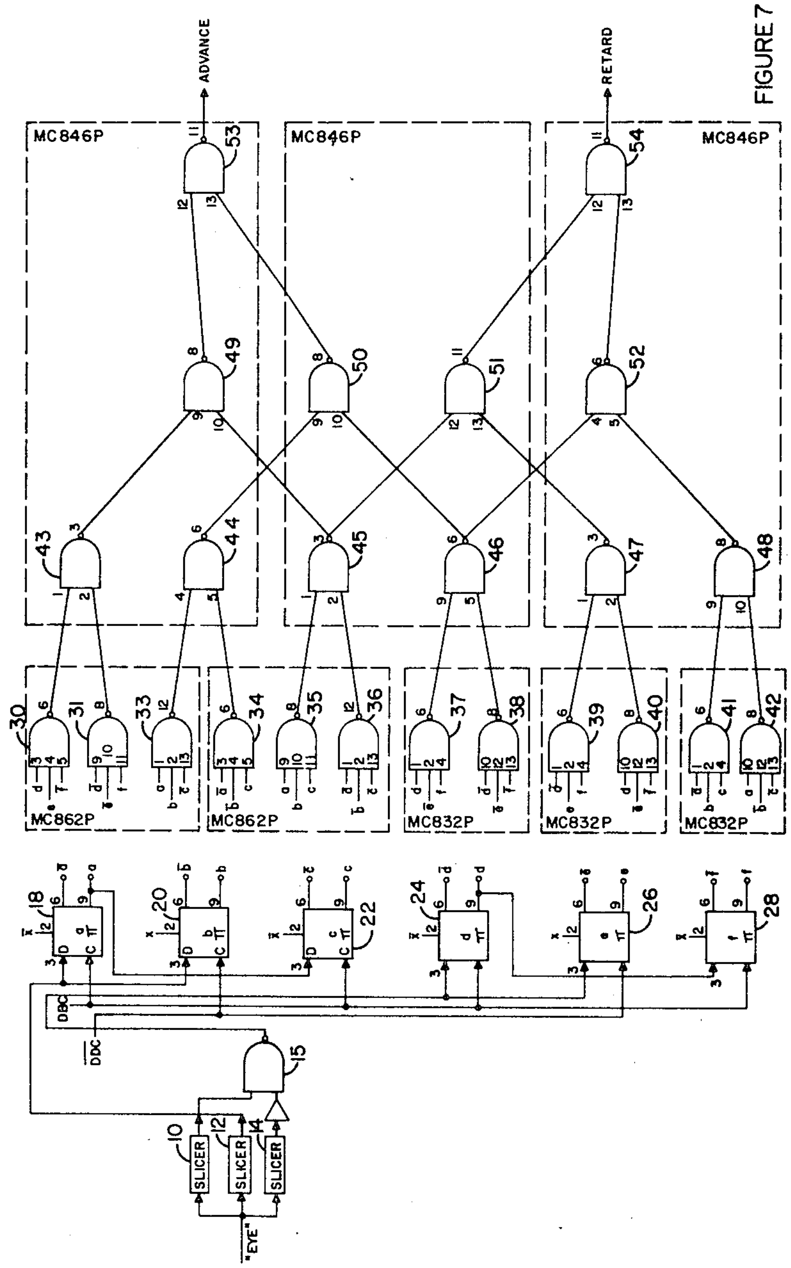
FIG. 7 is a schematic circuit diagram of a sample and decision logic tree in accordance with a presently preferred embodiment of the invention.

Referring to FIG. 7, there is shown a sample and decision logic tree utilized to provide advance or retard signals for controlling timing of the clock. Three slicers, an "upper" slicer 10, a "middle" slicer 12 and a "lower" slicer 14, are used in determining the level of the signal during the sample period. The outputs of slicers 10 and 14 are combined by a gate 15 to provide an "outer" slicer signal such as discussed above. The output of inner or middle slicer 12 is connected to a first or data (D) input of first and second sampling bistable multivibrators or "flip-flops" 18 and 20 whereas the output of the gate 15 is connected to a first or data (D) input of two further sampling flip-flops 24 and 26, flip-flops 18, 20, 24 and 26 serving in sampling the corresponding input signals thereto. For example, if the output of middle or inner slicer 12 is a logical 1, flip-flop 18 will sample and store this 1 as the associated clock therefore rises, flip-flop 18 maintaining this state irrespective of the input thereto. Later, when the clock therefore again rises (during the transition) flip-flop 18 assumes the state of the new data input thereto. As indicated flip-flop 20 is driven by a clock pulse train $\overline{DBC}$ which is inverse to that controlling flip-flop 18 and therefore, flip-flop 20, also be connected to the output of inner slicer 12, samples this output one-half clock period after flip-flop 18. One output of flip-flop 18 is connected to the data output of a further flip-flop 22 which thus samples and stores the output of flip-flop 18. Flip-flops 18, 20 and 22 hence all receive their inputs from inner slicer 12. In contrast, flip-flops 24 and 26 mentioned above, and a further flip-flop 28 corresponding in function to flip-flop 22, are connected to the outer slicers, or more particularly, to the output of gate 15, but otherwise perform or function in the same way as flip-flops 18, 20 and 22. These functions are summarized below:

| Sample Flip-Flop | Function |
|---|---|
| 18 | Store inner slicer input at baud decision time |
| 20 | Store inner slicer input at midway point between baud decision time |
| 22 | Store output of FF18 one time period earlier |
| 24 | Store outer slicer input at baud decision time |
| 26 | Store outer slicer input at midway point between baud decision time |
| 28 | Store the output of FF24 one time period earlier |

The outputs of flip-flops 18, 20, 22 and 24, 26, 28 are connected to gates 30 to 42 in the manner indicated in FIG. 7. For example, one output *a* of flip-flop 18 is connected to inputs of gates 33, 35 and 42 whereas the inverse output $\bar{a}$ is connected to an input of gates 34, 36 and 41. The output of gates 30 and 31 form the inputs to a first gate 43 in a series of six gates, the five further gates 44, 45, 46, 47 and 48 being connected to further pairs of gates 33 and 42 as shown. The output of gates 43 and 45 are connected to a further gate 49 whereas pairs of gates 44 and 46, 45 and 47, and 46 and 48 are respectively connected to further gates 50, 51 and 52. Gates 49 and 50 are connected to advance control gate 53 while gates 51 and 52 are connected to retard control gate 54. The operation of the logic tree of FIG. 7 can best be understood by considering specific examples. Referring again to FIGS. 3(*a*), 3(*b*) and 3(*c*), as discussed above, the clock of FIG. 3(*c*) is retarded in time with the ideal clock shown in FIG. 2(*d*). For this situation, the flip-flops 18, 20, 33, sample the input from inner slicer 12 and flip-flops 24, 26 and 28 sample the input from outer slicers 10 and 14 and store the signal levels indicated at points A, B, C in FIG. 3(*a*) and points D, E, F indicated in FIG. 3(*b*), respectively. The states of these flip-flops are summarized as follows:

| Flip-Flop | 18 | 20 | 22 | 24 | 26 | 28 |
|---|---|---|---|---|---|---|
| State | 1 | 1 | 0 | 1 | 0 | 1 |

The logic tree shown in FIG. 7 processes the digital word 110101 to produce an advance or "up" pulse, the pulse at the output of clock 53 actuates circuitry for advancing the phase of the clock by a fixed time increment. This action will continue until the clock is properly phased. Similarly, for the advanced clock shown in FIG. 4(*c*), the sampled slicer signals result in the following states for flip-flops:

| Flip-Flop | 18 | 20 | 22 | 24 | 26 | 28 |
|---|---|---|---|---|---|---|
| State | 1 | 0 | 0 | 1 | 0 | 1 |

For this digital word, the logic tree generates a retard or "down" pulse at gate 54 which retards the phase of the clock.

Referring to FIG. 8, the advance and retard outputs of sample and decision logic tree 16 are connected to a digital integrator 60 which may take the form of a conventional four-bit up-down counter. By integrating the output of logic tree 16 over a number of cycles, the digital integrator provides noise immunity for the system through eliminating spurious phase corrections signals such as may be caused by noise. The output of digital integrator 60 is connected to a digital to analog converter 62 to provide frequency correction and to a divider circuit 64, in the form of a frequency divider chain, to provide phase correction, divider 64 being connected to the output of a voltage controlled variable frequency oscillator 66 the output frequency of which is controlled by D to A converter 62. Hence, the advance and retard pulses are utilized to advance or retard in time the output of the frequency divider chain 64 and in this way to properly position the clock relative to the signal. Further, as stated, in addition to this phase correction, and attendant dynamic frequency correction, static frequency correction is also provided. Static frequency correction is accomplished by digital integrator 60 which counts the total number of up and down pulses produced and indicates the difference in counts. If the number of advance (up) pulses exceeds the number of retard (down) pulses, then the receive clock frequency is too high and digital-to-analog converter 62, responsive to the output of integrator 60, applies a correction voltage to variable frequency VCO 66 which, of course, serves as the local receive clock. The output of divider chain 64 is the corrected clock frequency which divided by two by divider 68 to produce a dibit clock used, as indicated, in controlling the sample and decision logic tree 16.

Figure 9:
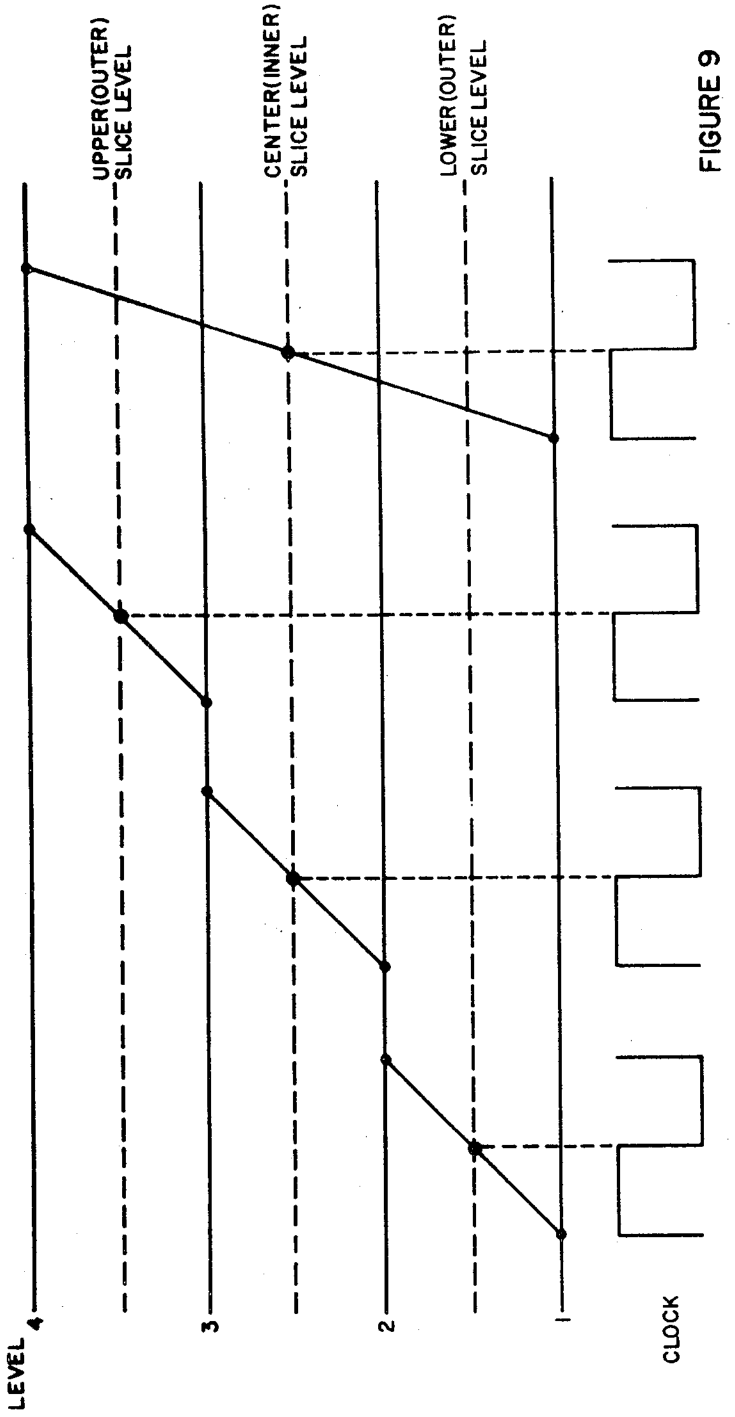
FIG. 9 is a further explanatory diagram illustrating the action of the clock recovery system for transitions on which the system acts.

From the examples discussed above with respect to a level 1 and level 4 transition, it can be appreciated that the generated advance and retard pulses tend to maintain the signal center sampling point (between clock sampling points) at the center or inner slicer level. However, this is only true of 1 to 4 and 4 to 1 transitions and it can be shown using FIGS. 2(*a*), (*b*), (*c*) and 3(*a*), (*b*) and (*c*) and 4(*a*), (*b*) and (*c*) that for a 3 to 4 transition, the sample and decision logic circuit 16 tends to hold the 3 to 4 transition at the 3 to 4 slice level. This is shown in FIG. 9 which illustrates the positions to which the clock adjusts itself for the various transitions. As illustrated, for the 1 to 2 and 2 to 1 transitions the clock moves itself so that the trailing edge is aligned with the lower slice level. Similarly, for 2 to 3 and 3 to 2 transitions the clock is aligned with the middle slice level whereas for 3 to 4 and 4 to 3 transitions the clock is aligned with the upper slice level. The 4 to 1 (and 1to 4) transitions were discussed above and, as stated, for these transitions the trailing edge of the clock is aligned with the center slice level. As state hereinabove, the logic circuitry of FIG. 5 ignores all transitions not shown in FIG. 9.

The level transitions and the digital words produced at the outputs of flip-flops 18, 20, 22, 24, 26 and 28 are tabulated:

| Transition | Digital Word 18 | 20 | 22 | 24 | 26 | 28 | Logic Tree Output |
|---|---|---|---|---|---|---|---|
| 3-4(3*b* to 1*a*) | 1 | 1 | 1 | 1 | 1 | 0 | Advance |
| 3-4(3*b* to 1*a*) | 1 | 1 | 1 | 1 | 0 | 0 | Retard |
| 4-3(1*a* to 3*b*) | 1 | 1 | 1 | 0 | 1 | 1 | Retard |
| 4-3(1*a* to 3*b*) | 1 | 1 | 1 | 0 | 0 | 1 | Advance |
| 1-4(1*d* to 3*a*) | 1 | 1 | 0 | 1 | 0 | 1 | Advance |
| 2-3(1*c* to 3*b*) | 1 | 1 | 0 | 0 | 0 | 0 | Advance |
| 1-4(1*d* to 3*a*) | 1 | 0 | 0 | 1 | 0 | 1 | Retard |
| 2-3(1*c* to 3*b*) | 1 | 0 | 0 | 0 | 0 | 0 | Retard |
| 4-1(1*d* to 3*a*) | 0 | 1 | 1 | 1 | 0 | 1 | Retard |
| 3-2(1*b* tp 3*c*) | 0 | 1 | 1 | 0 | 0 | 0 | Retard |
| 4-1(1*d* tp 3*a*) | 0 | 0 | 1 | 1 | 0 | 1 | Advance |
| 3-2(1*b* to 3*c*) | 0 | 0 | 1 | 0 | 0 | 0 | Advance |
| 2-1(1*c* to 3*d*) | 0 | 0 | 0 | 1 | 1 | 0 | Advance |
| 2-1(1*c* to 3*d*) | 0 | 0 | 0 | 1 | 0 | 0 | Retard |
| 1-2(1*d* to 3*c*) | 0 | 0 | 0 | 0 | 1 | 1 | Retard |
| 1-2(1*d* to 3*c*) | 0 | 0 | 0 | 0 | 0 | 1 | Advance |

By forcing the clock to align itself with the points discused, the bit error rate is optimized for a given signal to noise ratio.

Although the invention has been described with respect to an examplary embodiment thereof, it will be appreciated that variations and modifications in this exemplary embodiment may be effected without departing from the scope and spirit of the invention.

I claim:

1. A clock recovery circuit for a data communication system comprising clock generator means, a plurality of slicer circuits to which the received data signal is applied, sampling means responsive to said clock generator means for sampling the outputs of said slicer circuits at clock sampling points determined by said clock generator means and at points midway between the clock sampling points, logic circuit means responsive to the output of said sampling means for determining the data signal transitions which cross the slicer circuit decision levels at points approximately midway between the clock sampling points during a sampling interval and for producing a phase control output signal in accordance with the output of the sampling means for said transitions, and means for connecting the output of said logic circuit means to said clock generator means for controlling the output thereof in accordance with said phase control output signal.

2. A clock recovery circuit as claimed in claim 1 wherein said sampling means comprises a first multivibrator for storing the output of one of said slicer circuits at the baud decision time, a second multivibrator for sampling and storing the output of said one slicer circuit at a time midway between baud decision times, and a third multivibrator for period earlier.

3. A clock recovery circuit as claimed in claim 2 wherein said data signal is a four level signal, said plurality of slicer circuits comprises inner slicer circuit means for producing a first output when the data signal is less than the decision level thereof and a second output when the data signal is greater than the decision level thereof and outer slicer circuits means for producing a first output when the data signal lies between upper and lower slicer decision levels and for producing a second output when said data signal lies above said upper level or below said lower level, and said sampling comprises a first set of said first, second and third multivibrators for sampling the output of said inner slicer circuit means and a second set of said first, second and third multivibrators for sampling the output of said outer slicer circuit means.

4. A clock recovery circuit as claimed in claim 1 wherein said logic circuit means comprises electronic gate means responsive to the output of said sampling means for producing, in accordance therewith, an advance pulse for advancing the output of said clock generator means or a retard pulse for retarding the output of said clock generator means.

5. A clock recovery circuit as claim in claim 4 further comprising a frequency divider chain connected to the output of said clock generator means, the output of said logic circuit means being connected to said frequency divider chain to control the phase of the output thereof.

6. A clock recover circuit as claimed in claim 4 further comprising integrator means for integrating the output of said electronic gate means over a predetermined time inteval and for producing an output signal in accordance therewith for controlling the frequency output of said clock generator means.

7. A clock recovery circuit as claimed in claim 6 wherein said clock generator means comprises a variable frequency voltage controlled oscillator and said integrator means comprising counter means for counting the number of advance and retard pulses and for producing an output in accordance with the difference between the number of advance and retard pulses, and digital to analog converter means for converting the output of said counter means into a voltage signal for controlling the frequency output of said variable frequency voltage controlled oscillator.

* * * * *